(12) United States Patent
Miyake

(10) Patent No.: US 7,231,059 B1
(45) Date of Patent: Jun. 12, 2007

(54) IMAGE PROCESSING APPARATUS, METHOD AND STORAGE MEDIUM THEREFOR

(75) Inventor: Nobutaka Miyake, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1328 days.

(21) Appl. No.: 09/694,002

(22) Filed: Oct. 23, 2000

(30) Foreign Application Priority Data

Oct. 26, 1999 (JP) ................................ 11-304353

(51) Int. Cl.
G06K 9/00 (2006.01)
(52) U.S. Cl. ........................................ 382/100; 382/135
(58) Field of Classification Search ................ 382/135, 382/100, 298, 299, 251, 101, 102, 181; 356/71; 340/5.86

See application file for complete search history.

(56) References Cited

U.S. PATENT DOCUMENTS

| 4,068,934 | A | * | 1/1978 | Tanaka et al. ............. 353/26 A |
| 4,524,315 | A | * | 6/1985 | Nakatani et al. ............. 318/603 |
| 4,809,198 | A | * | 2/1989 | Terashita ..................... 355/35 |
| 5,018,213 | A | * | 5/1991 | Sikes ......................... 382/112 |
| 5,130,805 | A | * | 7/1992 | Rikima ....................... 358/296 |
| 5,438,636 | A | * | 8/1995 | Surka ......................... 382/279 |
| 5,594,809 | A | * | 1/1997 | Kopec et al. ............... 382/161 |
| 5,647,010 | A |  | 7/1997 | Okubo et al. ............... 382/100 |
| 5,765,089 | A |  | 6/1998 | Hasuo et al. ............... 399/366 |
| 5,798,844 | A |  | 8/1998 | Sakano et al. |
| 5,875,034 | A | * | 2/1999 | Shintani et al. ............. 358/296 |
| 6,135,355 | A | * | 10/2000 | Han et al. .................... 235/493 |
| 6,152,365 | A | * | 11/2000 | Kolls ......................... 235/381 |
| 6,160,609 | A | * | 12/2000 | Inoue .......................... 355/41 |
| 6,181,432 | B1 | * | 1/2001 | Furuya ....................... 358/1.11 |
| 6,188,468 | B1 | * | 2/2001 | Miyajima ................... 355/407 |
| 2002/0018228 | A1 | * | 2/2002 | Torigoe ..................... 358/1.14 |

FOREIGN PATENT DOCUMENTS

| JP | 7-36325 | 2/1995 |
| JP | 07-143335 | 6/1995 |
| JP | 07-200803 | 8/1995 |
| JP | 08-079512 | 3/1996 |
| JP | 09-091434 | 4/1997 |
| WO | WO 99/53428 | 10/1999 |

* cited by examiner

*Primary Examiner*—Joseph Mancuso
*Assistant Examiner*—Claire Wang
(74) *Attorney, Agent, or Firm*—Fitzpatrick, Cella, Harper & Scinto

(57) ABSTRACT

When image information for the purpose of being printed out has been entered, whether or not the image information contains a mark image such as a watermark is determined to such an extent that will not lower the throughput of a printer. To accomplish this, the image is input and elapsed time starts being measured from the start of detection processing that is for detecting whether a specific image is contained in the input image. If time runs out during the course of detection processing, a decision is rendered to the effect that the image does not contain the specific image.

9 Claims, 7 Drawing Sheets

FIG. 7
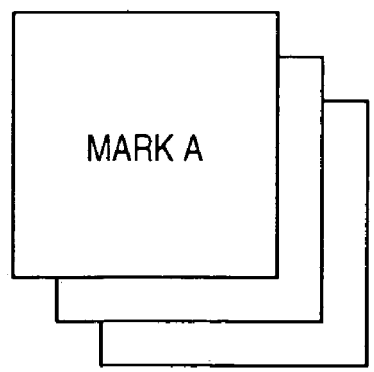
1/8 SUBSAMPLING PATTERN — MARK A
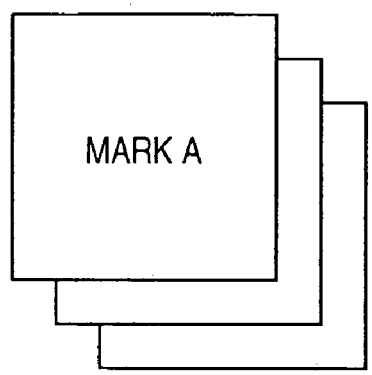
2/8 SUBSAMPLING PATTERN — MARK A
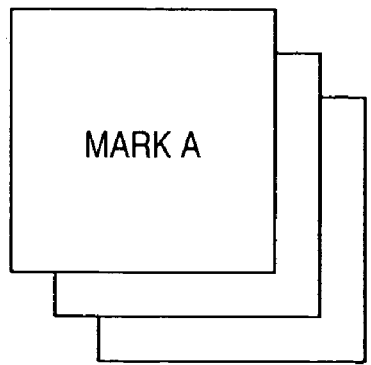
8/8 SUBSAMPLING PATTERN — MARK A

IMAGE PROCESSING APPARATUS, METHOD AND STORAGE MEDIUM THEREFOR

FIELD OF THE INVENTION

This invention relates to an image processing apparatus, method and storage medium for determining whether image information contains a specific mark such as a watermark.

BACKGROUND OF THE INVENTION

Research for multiplexing image information with other image-related information is being conducted extensively. There is continuing standardization of a technique referred to as an electronic-watermark technique through which image information representing a photograph or picture, etc., is multiplexed with additional information, such as the name of a copyright holder and an indication of whether or not the image is allowed to be used, in such a manner that the additional information is difficult to distinguish visually, and the multiplexed images are distributed over a network such as the Internet. Such a watermark often is used primarily for the purpose of copyright protection.

Another field of application is the prevention of counterfeiting of banknotes, stamps and securities necessitated by improvements in the image quality afforded by image input/output devices such as copiers, scanners and printers. For example, a special mark or watermark is multiplexed with a banknote, stamp or security in advance. When the mark is sensed by an image input/output device, it is assumed that the image information is that of a banknote, stamp or security. In response, printing is halted, a warning is issued or the entire surface of the printout is intentionally covered with blank ink or the like to thereby output a degraded image that makes it impossible to use a printed copy unlawfully.

An example of embedding of a watermark will be described with reference to FIG. 5. This illustrates an example of an electronic watermarking technique through which image information is combined with a high-frequency region, etc., rather than with a region in actual space, after being converted to a frequency region using a Fourier transform.

As shown in FIG. 5, image information is first converted to a frequency region by orthogonal transform processing 501. Examples of orthogonal transforms are a Fourier transform, direct cosine transform (DCT) and wavelet transform. Next, an adder 402 adds additional information to a specific high frequency that is difficult to distinguish visually. Often the addition is to a high-frequency region because the characteristic of human vision is such that the higher the frequency region, the lower the degree of sensitivity. The signal resulting from the addition operation is returned to a region in actual space by inverse orthogonal transform processing 503. Image information in which the watermark has been embedded is thus obtained. In a case where the watermark is used in a banknote, stamp or security, a transition is made to print processing 504, at which the banknote, stamp or security having the embedded mark, which is difficult to sense visually, is completed.

FIG. 6 illustrates a procedure through which a mark is detected from the paper of the printout. As shown in FIG. 6, printed matter is read by an image reader 601 such as a scanner to input information representing the printed matter. Since the input information represents a gray-scale image obtained by print screening processing, the information is subjected to reconstruction processing 602, which is reverse screening. In general, restoration processing uses an LPF (low-pass filter). At this time the dots constituting the printed matter and scanner aliasing distortion (moiré) caused by sampling must be eliminated. Next, an orthogonal transform 603 is applied to the reconstructed information and then the embedded additional information is detected from the data of the specific frequency components by detection processing 604.

The orthogonal transformation processing and detection processing can be executed within an image reader such as a scanner, within an image output device such as a printer, within the device drivers of these peripherals, within the operating system of a host computer or within application software.

The foregoing is an example of watermarking in which a mark is embedded in a frequency region. However, there is also a method through which a mark is embedded in a region of actual space rather than in a frequency region.

Further, the specification of Japanese Patent Application Laid-Open (KOKAI) No. 7-36325 is an example of a technique for embedding a visible mark. This application proposes means for adding a mark, which is composed of a plurality of concentric circles having different diameters, to a document and detecting the mark with a high degree of precision.

The techniques mentioned above, however, have a number of problems.

Specifically, with the above-described method of detecting a watermark, processing such as orthogonal transformation requires a great deal of image memory and processing time. The same holds true with the method of embedding a mark using a region in actual space, in which differences in tonality over a wide area must be evaluated.

In the detection of a mark such as visible concentric circles or the detection of a banknote, stamp or security, matching with a pre-registered pattern is evaluated. As with the watermark, a great deal of image memory and processing time are required.

A major factor in these methods is that the purpose is to detect whether or not an embedded mark or watermark exists. That is, since these methods are premised on the fact that a mark or watermark has already been embedded in all image information, not that much processing time is required if only the type of mark is to be identified.

However, in the detection of a banknote, stamp or security or the like, information representing a large number of items of information to undergo detection processing does not contain an embedded mark or watermark. In other words, an enormous amount of time is needed to prove reliably that image information that is entirely free of an embedded mark or watermark has no embedded watermark. Further, in order to prove reliably that no mark or watermark has been embedded, it is necessary to execute detection processing a plurality of times and judge the results while changing the detection conditions.

Nevertheless, devices such as copiers solve the aforementioned problem by using a large memory and implementing detection processing by hardware.

However, when one considers an arrangement in which the above-described detection processing is executed within the printer driver of an ink-jet printer or laser printer, it is found that execution of this detection processing is not realistic owing to the limited memory available and software processing speed that is slightly slower than that of processing by hardware. If processing time of a printer driver is too long, the print processing speed of the printer engine will exceed the speed of the printer driver, resulting in a major decline in performance. For example, the printer engine may cease operating.

SUMMARY OF THE INVENTION

Accordingly, an object of the present invention is to provide an image processing apparatus, method and storage medium in which when image information for the purpose of being printed out has been entered, it is possible to determine, to such an extent that will not lower the throughput of a printer, whether the image information contains an image such as a watermark.

According to the present invention, the foregoing object is attained by providing an image processing apparatus comprising: input means for inputting image information; determination means for determining whether an input image contains a mark indicative of a specific image; setting means for setting allowable time necessary for the determination to be made by the determination means; and control means for terminating determination processing by the determination means in a case where it cannot be determined whether the input image contains the mark within the allowable time set by the setting means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a diagram illustrating an example of registered patterns according to an embodiment of the present invention.

DESCRIPTION OF THE PREFERRED EMBODIMENT

A preferred embodiment of the present invention will be described in detail with reference to the accompanying drawings.

Figure 1:
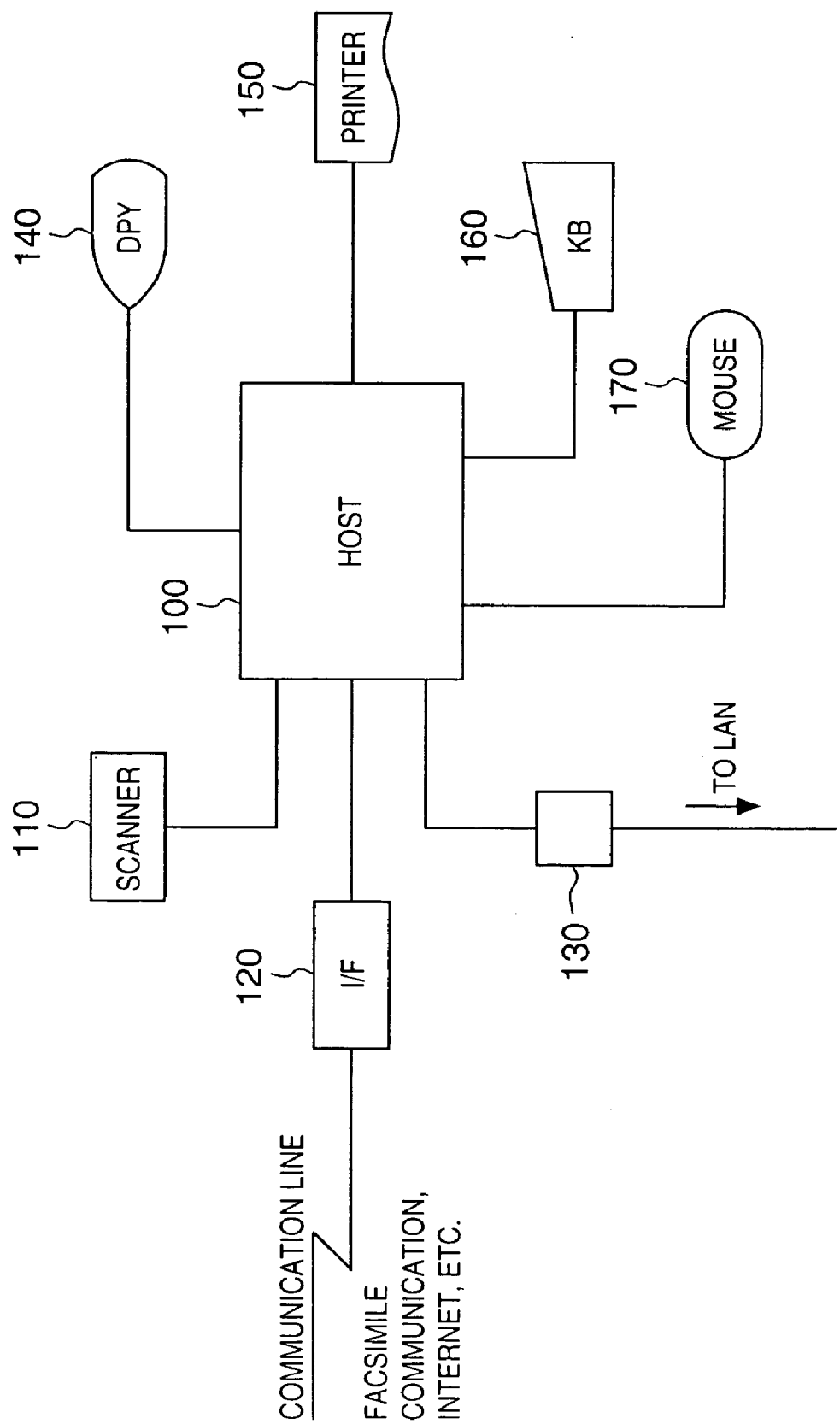
FIG. 1 is a block diagram illustrating the principal components of an image processing apparatus according to the present invention.

FIG. 1 is a block diagram illustrating an image processing apparatus according to this embodiment of the invention. As shown in FIG. 1, the apparatus includes a host computer (referred to as a "host" below) 100 for processing image information; a scanner 110 for reading an image document and generating image information; a communication interface (I/F) 120 for receiving the image information via a communication line; a LAN interface 130 for receiving the image information via a LAN; a display 140 such as an LCD, PDP, FED or CRT for displaying the image information as an image; a printer 150 for outputting the image information as an image to a recording medium such as printing paper; a keyboard (KB) 160 for various man-machine interfaces necessary for image processing; and a mouse 170.

The host 100 has a CPU for executing image processing and communication control processing; a ROM for storing a control program or the like; a RAM used as a working area for storing image information and executing image processing; a hard disk and magneto-optic disk for storing a large quantity of data; and an interface for connecting various peripherals.

Data received by the communication interface (I/F) 120 may be facsimile data or digital image information input via the Internet.

The printer 150 basically comprises a printer controller for interfacing the host 100 and a printer engine. The printer engine may be one which operates in accordance with ink-jet technology, electrophotography or some other printing technology.

The image processing apparatus constructed as set forth above can take on various forms. For example, it can be set up as a stand-alone copier by disconnecting the communication interface and LAN interface from the above-described arrangement and consolidating the display, keyboard and mouse together into a control panel, and as a stand-along facsimile machine by disconnecting the LAN interface, consolidating the display, keyboard and mouse together into a control panel and using the communication interface as a dedicated interface for facsimile. Further, if a personal computer is employed as the host and the above-mentioned units are connected as peripherals, an image processing system can be constructed.

It should be noted that although the image processing set forth below will be described taking as an example printer-driver software on the host side for creating image information to be output to a printer engine, the present invention is not limited to such an arrangement.

Figure 2:
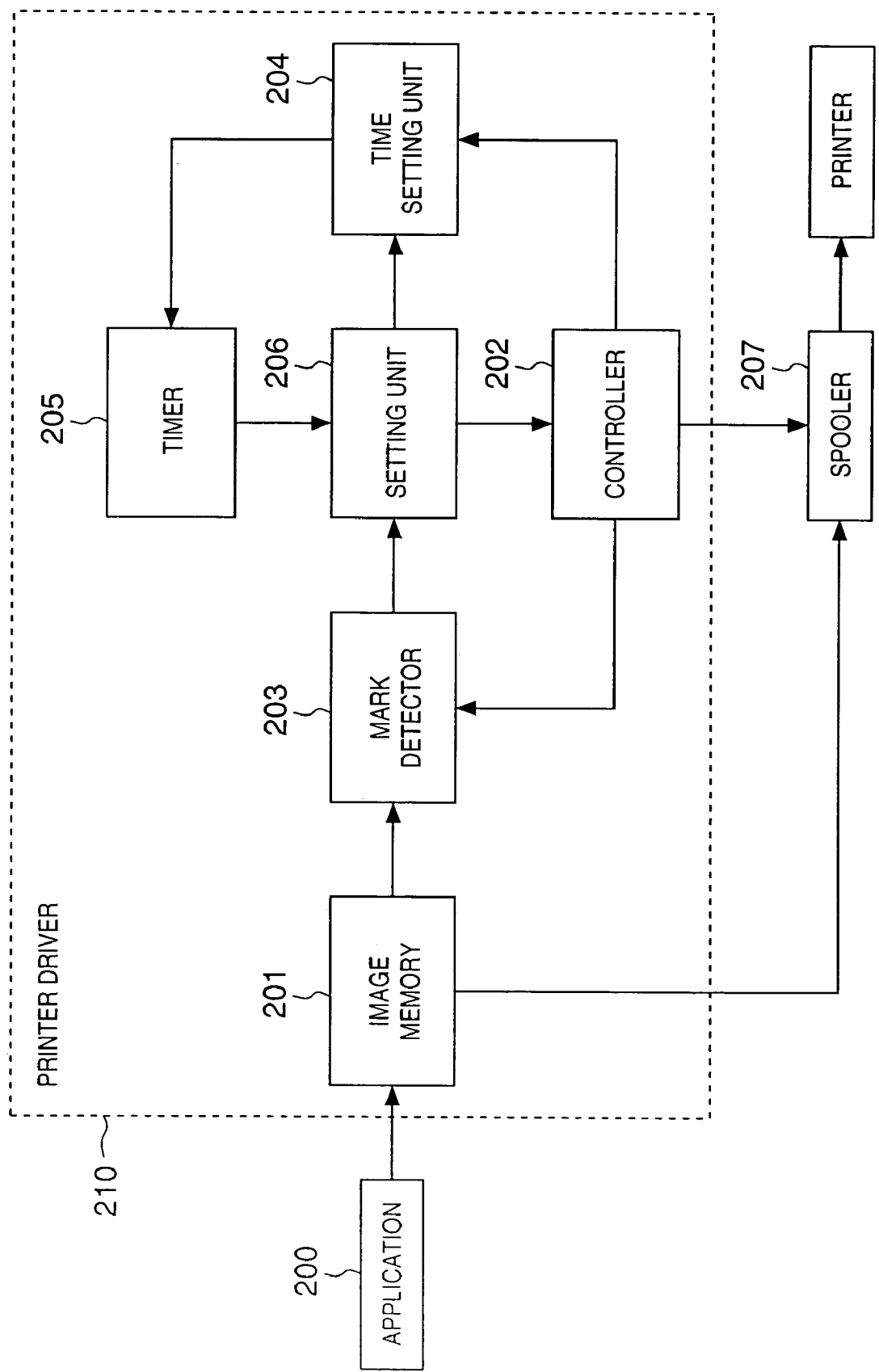
FIG. 2 is a block diagram illustrating an example of the configuration of a printer system according to the present invention.

FIG. 2 is a block diagram illustrating image processing executed by a printer driver (software) that has been installed in, e.g., the host, as well as operation peripheral to this processing.

As shown in FIG. 2, an application 200 executed within the host delivers its output to a printer driver 210. An image memory 201 reserved within the printer driver 210 stores, in fixed amounts, rasterized image data in accordance with a user print command from the application 200. It should be noted that rasterization may be performed within the application or within the printer driver.

A controller (control module) 202 administers control of various processes relating to mark detection. On the basis of an execute instruction from the controller 202, a mark detector 203 detects whether a specific mark is contained in a fixed quantity of image information that has been stored in the image memory 201. At the same time that controller 202 issues the detection execute instruction to the controller 202, a time setting unit 204 sets a time limit to be allowed for detection processing and actuates a timer 205. The time limit allowed for detection processing may be set statically in advance statically or dynamically. On the basis of results of detection from the mark detector 203 and a time-out signal from the timer 205, a decision unit 206 executes processing to decide the overall result of detection processing. The result of the decision is transmitted to the controller 202. If the decision is that a specific mark has been detected, the controller 202 sends a spooler 207 an instruction to halt the spooling of image information in the image memory 201, whereby printing is stopped. If the decision is that a specific mark has not been detected, the controller 202 allows printing so that image data that has been spooled via the spooler 207 is transmitted to a printer engine 208 via an interface (not shown).

Figure 3:
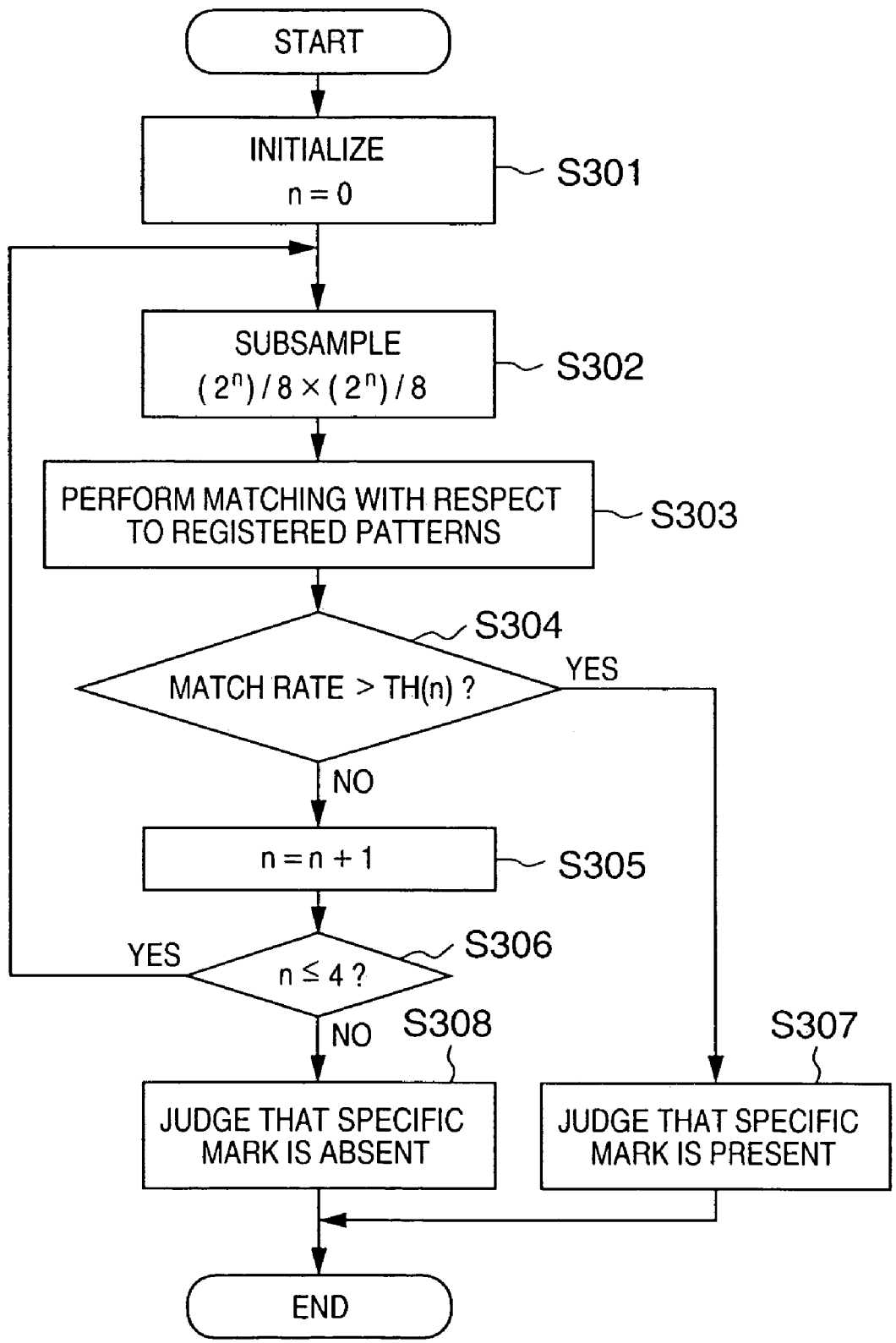
FIG. 3 is a flowchart illustrating the procedure of an operation performed by mark detection means.

FIG. 3 is a flowchart illustrating the procedure of operation performed by the mark detector 203. According to this embodiment, operation will be described taking detection of a visible mark as an example.

First, at step S301 in FIG. 3, various settings are initialized and a variable n is initialized to 0. Step S302 is a subsampling step at which a fixed amount of image information that has been stored in the image memory 201 is subsampled. The subsampling rate is assumed to be $2^n/8$ for both the horizontal and vertical magnifications. That is, when n=0 holds, one pixel out of eight (i.e., 1/8) is sampled in regard to both the horizontal and vertical magnifications.

Next, pattern matching is executed with regard to individual patterns registered in advance. It is required that the registered patterns be specific mark patterns that can identify a banknote, stamp or security, etc. In matching processing, a registered pattern also is changed in conformity with the subsampling rate as a manner of course. Patterns of a plurality of marks per $2^n/8$ (n=0, 1, 2, 3) subsamplings have been stored on the hard disk (not shown) within the host according to this embodiment, as illustrated in FIG. 7, and it is so arranged that any one group of marks will be selected in accordance with the value of n.

Next, at step S304, the rate at which pattern matches are achieved is compared with a threshold value TH(n) set in advance. The threshold value itself also is set to different values depending upon the variable n. The threshold value is stored in a storage device such as a hard disk in advance on a per-subsampling basis.

In pattern matching, decision processing is executed to successively determine whether the value of a subsampled pixel and pixels of a certain one mark of the patterns in FIG. 7 match. However, a predetermined allowable range is provided. More specifically, letting $P_i$ represent the value of a subsampled pixel of a print image and $Q_i$ the value of a pixel in a registered pattern, it is decided that a match with the value of a pixel of interest matches has been achieved when $P_i$ and $Q_i$ satisfy the following relation: $Q_i-a \leq P_i \leq Q_i+\alpha$, where $\alpha$ represents a predetermined value.

The match rate (the rate at which a match with a registered pattern is achieved) can be determined using various evaluation functions, e.g., the ratio of number of pixels (or the percentage thereof) which match at the time of matching processing to the number of pixels which do not match. If the match rate exceeds the threshold value ("YES" at step 304), it is judged that the pattern is the specific pattern at step S307 and processing is exited. If the match rate is equal to or less than the threshold value ("NO" at step S304), the value of n is counted up at step S305.

It is determined at step S306 whether the value of n is equal to or less than 4. If the answer is "YES", control returns to step S302, the subsampling rate is changed, the next pattern group is selected as the object of pattern matching and pattern matching processing is repeated.

According to this embodiment, processing is repeated until the subsampling magnification becomes one, i.e., until 1× magnification is attained. If the match rate still does not exceed the threshold value even at such time, then it is judged that a specific pattern is absent at step S308.

Figure 4:
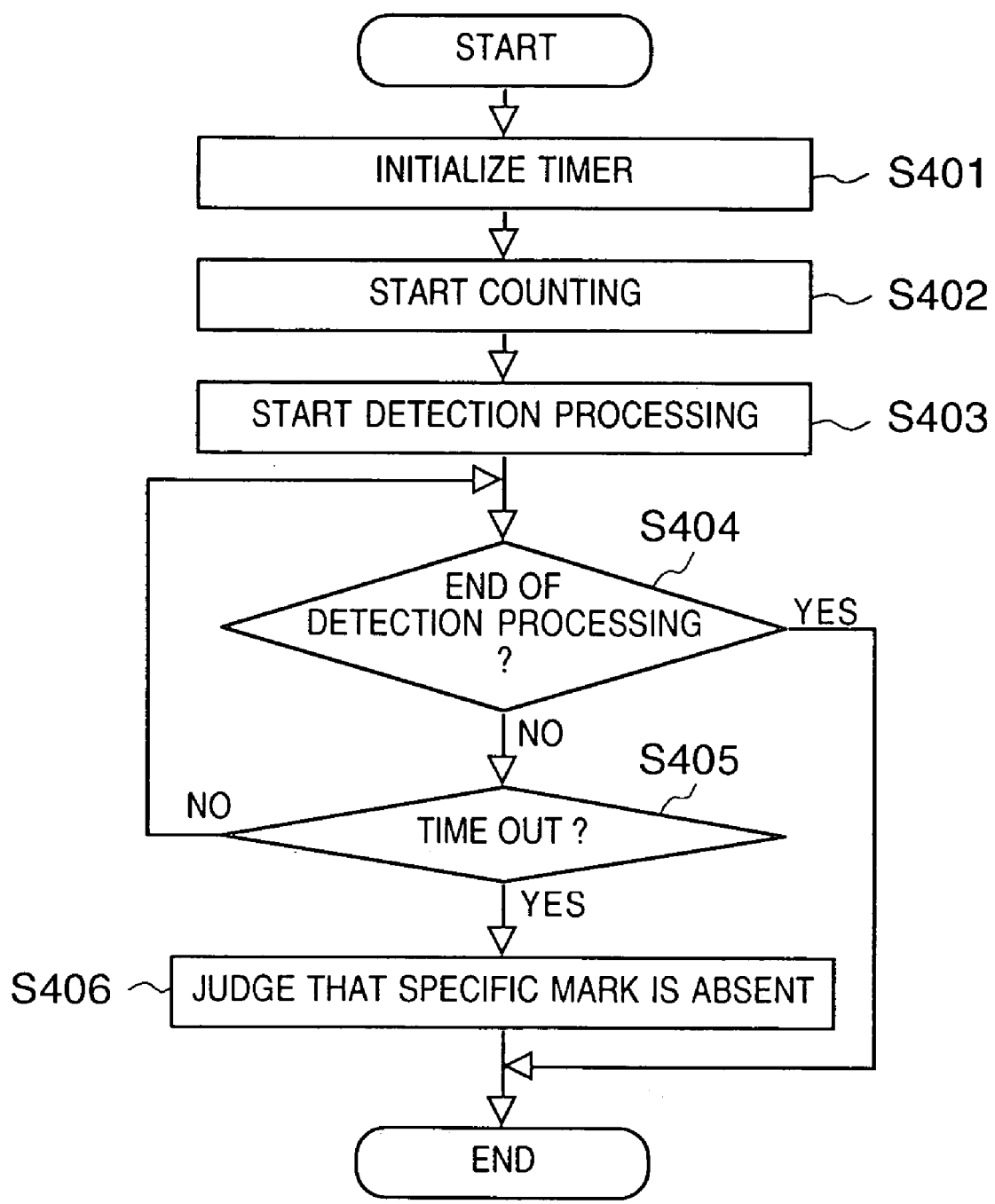
FIG. 4 is a flowchart illustrating the procedure of an operation performed by decision means.
Figure 5:
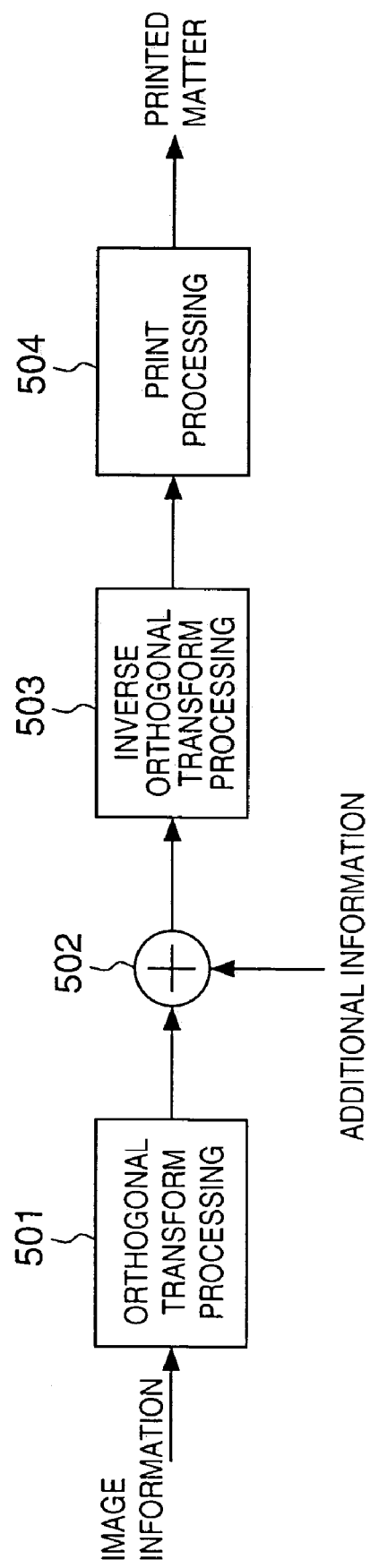
FIG. 5 is a flowchart is a block diagram showing an example of multiplexing.
Figure 6:
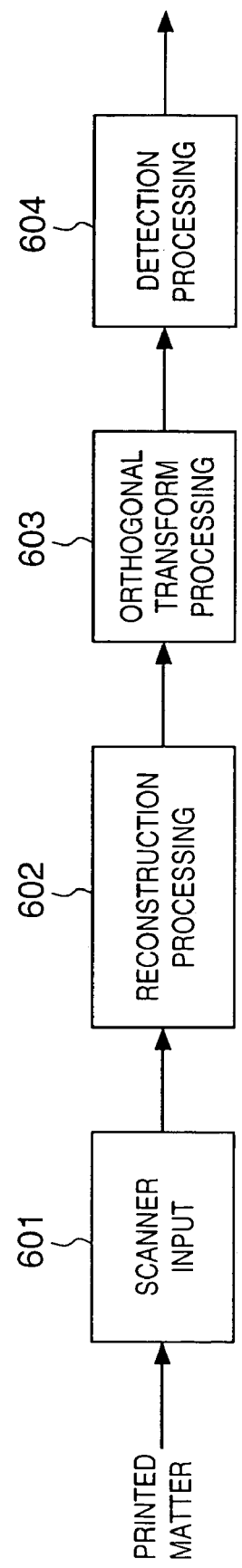
FIG. 6 is a flowchart is a block diagram showing an example of demultiplexing.

FIG. 4 is a flowchart illustrating the relationship between a timer and mark-processing detection time in the decision unit 206.

The timer is initialized at step S401 and starts counting at step S402. Detection processing described above in connection with FIG. 3 is started at step S403. As a result, detection processing is started by the detection execute instruction at the same time that the timer starts counting. Whether detection processing has ended is determined at step S404. This is followed by step S505, at which it is determined whether time measured by the timer that started counting has reached a set time. If the timer has not timed out ("NO" at step S405), control returns to step S404. Conversely, if detection processing has not ended within the set time limit, i.e., if a time-out signal has entered as an interrupt signal during detection processing ("YES" at step S405), then it is judged that the specific mark is absent and processing is forcibly terminated at step S406.

In other words, as should be obvious from FIG. 4, this embodiment is characterized in that operation is speeded up by providing a time limit during which detection processing is allowed.

There are many cases in which processing for detecting a specific mark is such that proving the absence of mark requires a processing time longer than that needed to determine that a mark is present. The example of the flowchart shown in FIG. 3 is such that if a mark exists in an image, the rate at which pattern matching is judged to have been attained is high even with a coarsely subsampled image, and detection processing ends at the first match. By contrast, if an image does not contain a mark, repetitive processing must be executed while changing detection conditions in order to demonstrate the absence of the mark. The reason for this is that it is necessary to execute detection processing using finer and finer detection conditions with each repetition. As a consequence, the rate of increase in processing time increases beyond the number of repetitions.

This holds true not only for visible marks but also for detection of watermarks. If an image contains a watermark, this can be clarified instantly by the initial loop (the loop for which n=0 holds). If an image does not contain a watermark, processing time is prolonged. If, say, a frequency region is used for the embedding of a watermark, processing time becomes much longer in comparison with a case where a region of actual space is used.

If the foregoing characteristic is utilized, then, even if a certain fixed time limit is provided for detection processing, this processing will end within the time limit when a mark (inclusive of a watermark) is present. As a result, the mark can be detected at a high probability. In other words, the setting of the time limit makes it possible to shorten greatly time expended to prove the absence of a mark. This provides a detection-processing error rate that compares favorably with that obtained when no time limit is set.

As set forth above, a very large number of items of information do not contain a specific mark. The printing of image information containing an embedded specific mark is an act performed by some users with unlawful intentions. For the vast majority of users, mark detection processing itself is processing that is not necessary. In cases where detection processing is built in, therefore, how to design detection processing that does not cause a decline in printer performance is of vital importance.

Further, detection processing is executed repeatedly in increments of the fixed amount of image information that has been stored in the image memory. That is, since there many cases where an image memory does not have enough capacity to store one page of image information, detection processing is executed a plurality of times for a single image.

Even if the existence of a specific mark is overlooked when a certain fixed amount of image information is subjected to detection in execution of detection processing a plurality of times, often the specific mark will have been printed over the entirety of the image. By executing processing a plurality of times, therefore, a mark missed in one cycle of processing is likely to be found in another cycle of processing.

The time limit applied to detection processing will be described next.

As mentioned earlier, the value of the time limit may be decided statically or dynamically.

Here an ink-jet printer will be taken as an example. There are increasing numbers of such printers capable of printing at high speed thanks to an increase in the ink discharge frequency of the ink head that discharges ink and an increase in printhead density. At the same time, owing to improvements in the CPU performance of the host computer, color processing, image processing such as quantization and resolution conversion and even the creation of print data in the printer driver have been speeded up. Nevertheless, when complicated processing is executed, there are instances where advantage cannot be taken of the speed of the printer engine. In other words, processing executed by the printer driver cannot keep of with the printer engine and, as a result, the printer stops operating temporarily.

Let H represent the time needed to create image data in the printer driver in a case where mark detection processing is not executed, let M represent a critical time at which the printing operation by the printer engine attains a waiting state in a case where processing steps executed by the printer driver are increased, and let m represent the number of times detection processing is executed in a case where mark detection is performed a plurality of times for one image because of the storage capacity of the image memory. Average allowed time Tav per detection operation preferably satisfies the following relation:

$$Tav \leq (M-H)/m$$

Thus, there should be no change in the speed of the printer engine whether or not mark detection processing is executed. In other words, with detection processing using the average allowed time Tav, there should be no adverse effect upon the performance of the printer engine regardless of the fact that detection processing has been included as additional processing.

An effective method of setting time dynamically is to estimate the time H, which varies dynamically depending upon the amount of local image information, and exercising control in such a manner that the above-cited relation is satisfied. In other words, the time required for image processing such as color processing varies depending upon the complexity of the image information. If this processing time can be estimated, then so can the value of H, which is the overall processing time. In any case, the optimum value of Tav can be calculated by finding the value of H in the above-cited relation experimentally.

Printer processing speed can also be found by, e.g., making a connection by a bidirectional communication cable, querying the printer for the model name at the initial stage of printing and referring to the acknowledge signal sent back. More specifically, since the processing capability of the printer may be judged by ascertaining the model name of the printer, the value of Tav may be read out of a pre-registered table based upon the clarified named of the printer model and may be set as the time-out period.

The foregoing is a description of the preferred embodiment. However, as mentioned above, the conditions of the mark detection means can be changed by a method other than that of FIG. 3. Ordinarily, detection processing employs a method in which detection is performed coarsely at the beginning and then more finely in a gradual manner. However, this embodiment is effective in a method wherein detection processing is performed repeatedly while varying the detection conditions.

By way of example, the invention is applicable to a case where the number of quantization bits of image data to be printed is varied. More specifically, in a case where a print image is represented by eight bits per pixel, detection is performed based upon the four higher order bits at the initial stage of mark detection, then detection is subsequently performed while raising the number of bits gradually to five, six and so on. Naturally, if a mark is detected at any of these stages, no further detection processing is carried out.

The present embodiment has been described taking a printer driver as an example. However, this does not impose any limitation and the invention may be applied to processing executed within a printer engine. Further, similar processing can be implemented even if the device which inputs the image information is a scanner proper or a unit within the scanner driver.

Further, an example has been described in which it is determined whether image data to be printed contains an image (a visible image or a visible watermark) that matches the registered image of a mark. However, the invention may be applied to a case where an image to be printed contains an invisible watermark. In such case an orthogonal transform would be applied in, e.g., units of (8×8)-pixel blocks subsampled from rasterized image data in the manner described earlier, and registered values would be compared with the value of a specific frequency component within this block of pixels.

It goes without saying that the object of the invention is attained also by supplying a storage medium (or a recording medium) storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiment and the storage medium storing the program codes constitutes the invention. Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

Thus, in accordance with the present embodiment, as described above, detection processing that does not cause a decline in printer performance can be implemented by utilizing the characteristics of mark detection.

Further, since an implementation in which detection processing is incorporated in a printer driver is improved, it is possible to inhibit counterfeiting of banknotes, stamps and securities, etc., and to prevent copyright infringement of image information even in systems other than closed systems such as copiers.

In accordance with the present invention, as described above, when image information for the purpose of being printed out has been entered, it is possible to determine, to such an extent that will not lower the throughput of a printer, whether the image information contains an image such as a watermark.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
input means for inputting image information;
determination means for sequentially repeating determination of whether a mark indicative of a specific image is contained in an input image whenever precision of sampling of the image information is raised in stages or whenever a number of quantization bits of the image information is increased in stages;
setting means for setting an allowable time period necessary for the determination to be made by the determination means; and
control means for terminating determination processing performed by the determination means in a case where it can be determined whether the mark indicative of a specific image is contained in the input image within the allowable time period set by the setting means, and for determining that the mark indicative of a specific image is not contained in the input image and terminating the determination processing performed by the determination means even during the determination processing performed by the determination means in a case where it cannot be determined that the mark indicative of a specific image is contained in the input image within the allowable time period set by the setting means.

2. The image processing apparatus according to claim 1, wherein a threshold value for determining in the determination means whether the mark indicative of a specific image is contained in the input image is provided for each stage of the precision.

3. The image processing apparatus according to claim 1, further comprising output means for outputting the image that is input by the input means to printing means,
wherein the output means outputs the input image in a case where the mark indicative of a specific image is not detected within the allowable time period.

4. The image processing apparatus according to claim 3, wherein a period of time that satisfies the relation below is set as the allowable time period:

$$Tav \leq (M-H)/m$$

where H represents time needed for the output means to form an output image,
M represents a critical time at which the printing means waits for print data to be received and at which a printing operation performed by the printing means enters a waiting state,
m represents number of times the determination means executes determination processing, and
Tav represents the allowable time period per determination processing.

5. The image processing apparatus according to claim 3, wherein the output means is suspended to output the input image in a case where the determination means determines that the mark indicative of a specific image is contained in the input image.

6. The image processing apparatus according to claim 1, wherein the allowable time period is dynamically variable.

7. The image processing apparatus according to claim 1, wherein the mark indicative of a specific image includes a watermark.

8. An image processing method comprising:
an input step of inputting image information;
a determination step of sequentially repeating determination of whether a mark indicative of a specific image is contained in an input image whenever precision of sampling of the image information is raised in stages or whenever a number of quantization bits of the image information is increased in stages;
a setting step of setting an allowable time period necessary for the determination to be made at the determination step; and
a control step of terminating determination processing performed at the determination step in a case where it can be determined whether the mark indicative of a specific image is contained in the input image within the allowable time period set at the setting step, and of determining that the mark indicative of a specific image is not contained in the input image and terminating the determination processing performed at the determination step even during the determination processing performed at the determination step in a case where it cannot be determined that the mark indicative of a specific image is contained in the input image within the allowable time period set at the setting step.

9. A computer-readable medium storing program code read in and executed by a computer, the computer-readable medium comprising:
program code of an input step of inputting image information;
program code of a determination step of sequentially repeating determination of whether a mark indicative of a specific image is contained in an input image whenever precision of sampling of the image information is raised in stages or whenever a number of quantization bits of the image information is increased in stages;
program code of a setting step of setting an allowable time period necessary for the determination to be made at the determination step; and
program code of a control step of terminating determination processing performed at the determination step in a case where it can be determined whether the mark indicative of a specific image is contained in the input image within the allowable time period set at the setting step, and of determining that the mark indicative of a specific image is not contained in the input image and terminating the determination processing performed at the determination step even during the determination processing performed at the determination step in a case where it cannot be determined that the mark indicative of a specific image is contained in the input image within the allowable time period set at the setting step.

* * * * *

UNITED STATES PATENT AND TRADEMARK OFFICE
CERTIFICATE OF CORRECTION

PATENT NO. : 7,231,059 B1  Page 1 of 1
APPLICATION NO. : 09/694002
DATED : June 12, 2007
INVENTOR(S) : Nobutaka Miyake It is certified that error appears in the above-identified patent and that said Letters Patent is hereby corrected as shown below:

Col. 3, line 42, "a flowchart is" should be deleted.

Col. 3, line 44, "a flowchart is" should be deleted.

Col. 4, line 59, "statically" should be deleted.

Col. 5, line 41, "matches" should be deleted.

Col. 7, line 2, "of" should read --up--.

Signed and Sealed this

Twenty-eighth Day of July, 2009

JOHN DOLL
*Acting Director of the United States Patent and Trademark Office*